Sept. 16, 1969 M. H. CROWELL 3,467,880

MULTIPLE-IMAGE ELECTRON BEAM TUBE AND COLOR CAMERA

Filed Aug. 21, 1967 4 Sheets-Sheet 1

INVENTOR
M. H. CROWELL
BY
Wilford L. Wisner
ATTORNEY (ELECTRON BEAM SIDE)

MULTIPLE-IMAGE ELECTRON BEAM TUBE AND COLOR CAMERA

Sept. 16, 1969 M. H. CROWELL 3,467,880

MULTIPLE-IMAGE ELECTRON BEAM TUBE AND COLOR CAMERA

Filed Aug. 21, 1967 4 Sheets-Sheet 4

United States Patent Office 3,467,880
Patented Sept. 16, 1969

3,467,880

MULTIPLE-IMAGE ELECTRON BEAM TUBE AND COLOR CAMERA

Merton H. Crowell, Morristown, N.J., assignor to Bell Telephone Laboratories Incorporated, Murray Hill, N.J., a corporation of New York Filed Aug. 21, 1967, Ser. No. 662,022
Int. Cl. H01j *31/48, 31/26;* H04n *3/00*
U.S. Cl. 315—11 4 Claims

ABSTRACT OF THE DISCLOSURE

In an electron beam storage device employing a monolithic array of reverse-biased p-n junctions, the surface scanned by the electron beam has superimposed upon it two interleaved conductive combs with apertures centered over the junctions. The voltages applied to the two conductive combs are switched so that first one passes electrons to a first set of junctions underlying itself for at least one scan period while the other repels them and then the other passes the electrons to a second set of junctions underlying itself, while the first repels them.

Appropriate color filters on the opposite, light-receiving side, in the case of a camera tube, can make the two sets of junctions responsive to different colors. In a scan converter, the conductive combs on the writing beam side control the diffusion of the electron-created holes; and the writing electron beam and the reading electron beam can effectively scan different sets of junctions, thereby avoiding spurious effects that occur when both beams strike the same junction at the same time.

BACKGROUND OF THE INVENTION

This invention relates to electron beam storage devices such as television camera tubes and scan converters.

The television camera tubes and scan converters in which the present invention may most advantageously be used are those in which the target of the electron beam or beams is a monolithic array of reverse-biased p-n semiconducting junctions. A scan converter is an electron beam storage device in which opposite surfaces of the monolithic array are scanned by two different electron beams at different scanning rates.

Television viewers are known to prefer color television displays to black-and-white displays when the former can be made economically available. In the television-telephone type of common-carrier public communication service, it would be desirable to provide at least two-color information in the transmitted signal in an economical fashion.

Also, in such a television-telephone system, it may be desirable to provide a low scanning rate in the transmitter to conserve transmission bandwidth and then convert to a higher scanning rate in the receiver to avoid flicker objectionable to the viewer. Typical scan converters in which my present invention can be used are those disclosed in my copending application with E. I. Gordon, Ser. No. 645,333, filed June 12, 1967, and assigned to the assignee hereof. In the case of up-conversion of the scanning rate, the scan converter incorporates a semiconductive target which is adapted to provide traps for holes so that several repetitious readout scans can be made for every writing scan.

It has been found that a "windshield wiper effect" occurs if the scans are permitted to occur so that reading and writing beams affect the same p-n junction at the same time. The sudden increase in output current causes undue brightening at each such spot; and a bright line will move across the viewing screen.

SUMMARY OF THE INVENTION

According to my invention, both a color television camera and a scan converter free of the "windshield wiper effect" are provided with interleaved conductive comb structures on the electron beam target surfaces of the tube; and these structures are supplied with control voltages to provide access to only one set of a plurality of sets of underlying charge-storing regions. In the camera tube, the light is incident upon the opposite surface of the target through color filters arranged to overlie charge-storing regions underlying respective comb structures on the opposite surface. In the scan converter, there is a one-to-one correspondence between comb structures on the opposite target surfaces; and voltages are applied to the corresponding comb structures so that when access is provided through one, it is not provided through the other and vice versa. Thus, storage and readout cannot occur simultaneously in the same region from opposite sides of the target.

In those embodiments in which storage occurs through the action of a writing electron beam, access is preferably denied to the writing electron beam by applying a voltage to the appropriate comb structure to prevent electron-created minority carriers from diffusing to the p-n junctions before recombining. In an alternative embodiment, access is denied to the writing beam applying a sufficiently negative voltage to the appropriate comb structure in order to prevent the writing beam electrons from passing through the apertures thereof. Access is typically denied to the reading electron beam in the latter fashion. Thus, reading beam electrons are denied access to the target by the appropriate comb structure by preventing them from passing through the apertures of that comb structure.

BRIEF DESCRIPTION OF THE DRAWING

Further features and advantages of my present invention will become apparent from the following detailed description, taken together with the drawing, in which.

DESCRIPTION OF ILLUSTRATIVE EMBODIMENTS

Figure 1:
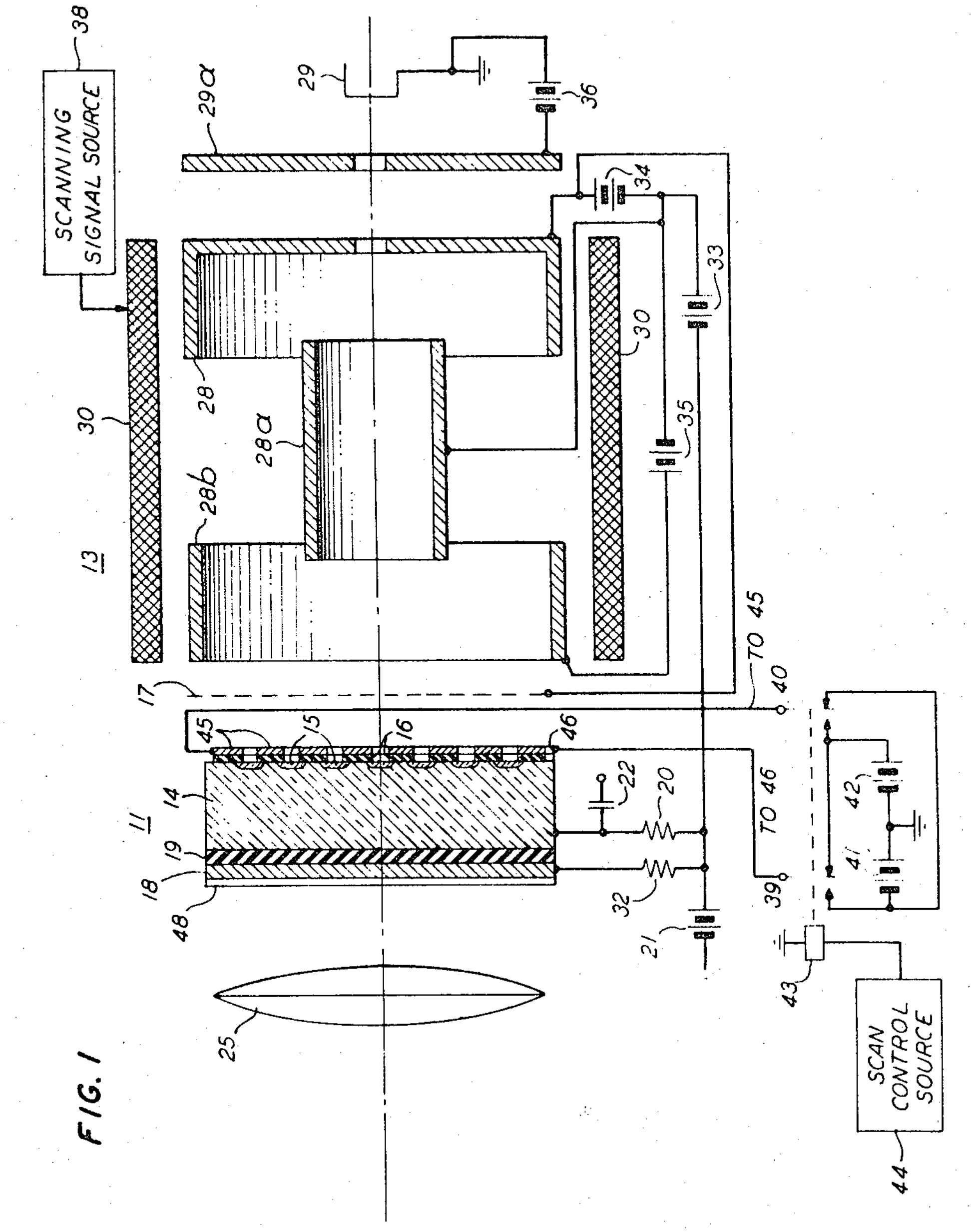
FIG. 1 is a partially pictorial and partially schematic illustration of an illustrative embodiment serving as a color television camera tube.

In the illustrative embodiment of FIG. 1, a two-color camera tube is provided by the combination including the target assembly 11, the image-forming legs 25, and the reading electron beam assembly 13. The light passing through lens 25 and into the target assembly 11 is effective to produce a pattern of electron-hole pairs that discharge the p-n junctions in a pattern that is directly related to the light image. The reading electron beam recharges the junctions to their full reverse bias in the process of reading the information stored in them. The target assembly 11 comprises a wafer, for example, a planar array, of p-n junction diodes in a silicon crystal, the bulk or substrate 14 of which is n-type. The p-type regions 15 of the diodes are formed on the reading beam side of the target assembly and provide a plurality of discrete p-n junctions with respect to the common substrate 14. The portions of the substrate 14 extending to the reading beam surface of the assembly are covered by the insulating coating 16, which also overlaps the edges of the junctions, which might otherwise be subjected to discharging by the reading beam or to accidental shorting.

The target assembly 11 includes, on the light-receiving surface, a substantially transparent field-effect electrode 18 which is separated from the substrate 14 by the silicon dioxide insulating layer 19. The combination of layer 19 and electrode 18 serves to inhibit electron-hole recombination in the vicinity of their creation by the incident light. This experimentally observed effect is described in more detail in the copending patent application of M. H. Crowell, J. V. Dalton, E. I. Gordon and E. F. Labuda, Ser. No. 641,257, filed May 25, 1967, and assigned to the assignee hereof. On top of the field-effect electrode 18 are deposited thin-film color filters, such as the filter 48. These filters will be described in more detail hereinafter in connection with FIG. 3.

The substrate 14 is connected through a suitable low-resistance ohmic contact and the load resistance 20 to the positive terminal of a battery 21; and the negative terminal of the battery 21 is connected to ground, as is the cathode 29 in assembly 13. The field-effect electrode 18 is also connected to a suitable bias point, for example, through the resistor 32 to the positive terminal of battery 21.

Figure 2:
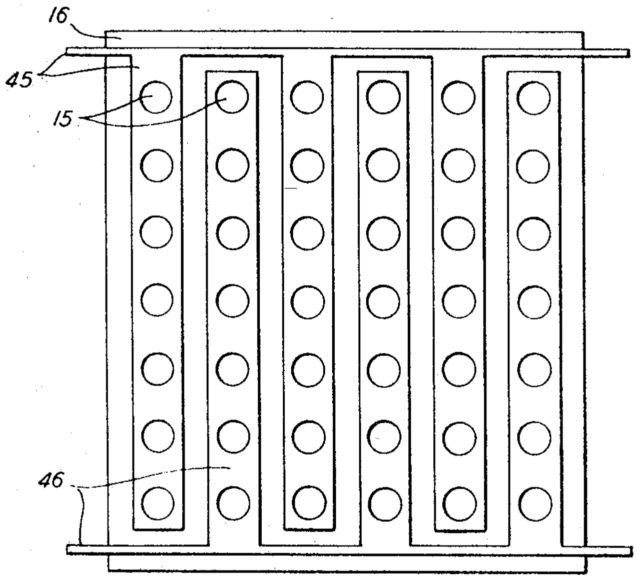
FIG. 2 is a pictorial right-side elevation of the target of the embodiment of FIG. 1.

As will be seen in more detail in FIG. 2, the oxide insulating layer 16 of FIG. 1 is covered with an interleaved pair of conductive comb structures 45 and 46, which have apertures coincident with the apertures in insulating layer 16, exposing the p-type regions 15. Typically, the number of divisions in each comb structure is much greater than that shown, inasmuch as the p-type regions 15 would be much more numerous that those shown. The comb structures 45 and 46 are respectively connected to the poles of switches 39 and 40, the make contact of the former and the break contact of the latter being connected to the negative terminal of battery 41 and the other contacts of each being connected to the positive terminal of battery 42, so that one is biased positively with respect to the cathode 29 and the other is biased negatively with respect to the cathode. The positive terminal of battery 41 and the negative terminal of battery 42 are connected together to ground, the cathode potential. The magnitude of the negative bias is sufficient to prevent the electrons from passing through the apertures of the comb structure that is negatively biased. The relative polarities of the voltages supplied through switches 39 and 40 may be reversed by changing the signal applied to a relay 43 from a scan control source 44. Illustratively, relay 43 is shown released so that comb structure 46 is admitting electrons. Upon change of the signal from source 44, relay 43 will operate so that comb structure 45 admits electrons.

A secondary electron collector electrode 17 in the form of a grid is provided on the reading beam side of the target assembly 11 in order to collect electrons secondarily emitted from the assembly 11 in response to the reading beam. The electrode 17 is biased positively with respect to the substrate 14 by connection through batteries 34 and 33 to the positive terminal of battery 21.

The reading electron beam assembly 13 is substantially conventional and includes an electron gun including the cathode 29, the apertured electrode 29*a*, the accelerating anode 28, the focusing electrode 28*a*, and the collimating electrode 28*b*. Electrode 29*a* is biased negatively with respect to the cathode 29 by the battery 36. The accelerating anode 28 is connected to the positive terminal of battery 34. The focusing electrode 28*a* is connected to the positive terminal of battery 33. The collimating electrode 28*b* is connected to the positive terminal of battery 35, and the negative terminal of battery 35 is connected to the positive terminal of battery 33. The reading electron beam may have an effective width at least as great as the minimum separation of p-n junctions belonging to different sets; but this relationship is not required.

A specific example of biases with respect to ground in FIG. 1 is as follows.

| Component: | Volts |
|---|---|
| 14 | +5 |
| 18 | +5 |
| 29*a* | −20 |
| 28 and 17 | +300 |
| 28*a* | +67 |
| 28*b* | +100 |
| 41 (negative terminal) | −2 |
| 42 (positive terminal) | +2 |

The reading electron gun assembly is surrounded by the magnetic deflection yoke 30 which is driven by the scanning signal source 38. The reading electron beam can thus be swept repetitively over the surface of target 11 as in other camera tubes.

Figure 3:
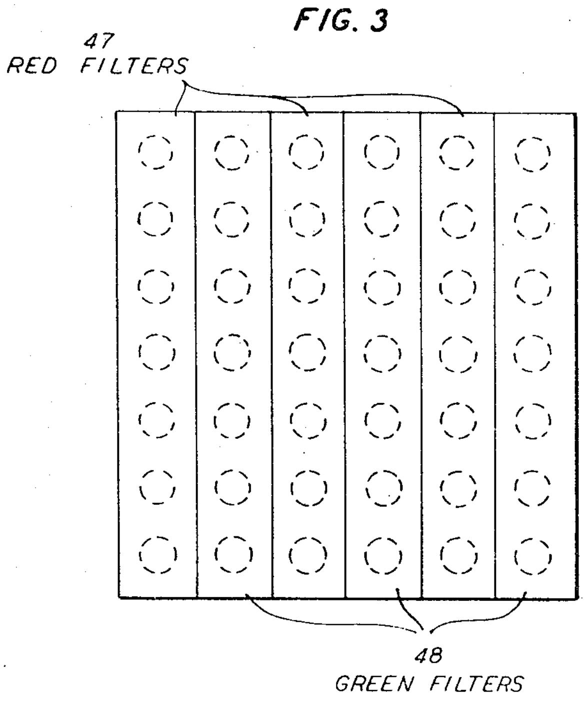
FIG. 3 is a pictorial left-side elevation of the target of the embodiment of FIG. 1.

Reference is now made to FIG. 3, from which it can be seen that the red filters 47 are deposited on the light-receiving surface directly opposite the apertures in the comb structure 46; and the green filters 48 are deposited on the light-receiving surface directly opposite the apertures in comb structure 45. Advantageously, the filters 47 and 48 are most easily fabricated if arranged to cover the entire light-receiving surface in alternating stripes, as shown. The filters 47 and 48 are interference filters of the type known in the optical art and are made with multiple dielectric layers in a manner similar to that of dielectric laser mirrors, but adapted to pass the desired color. The number of filter stripes of each color would equal the number of divisions in the respective comb structure.

The fabrication of the target assembly 11 will be described in more detail after the description of the operation of the embodiment of FIG. 1.

In operation, appropriate color components of light pass through the filters 47 and 48 and thence through the electrode 18 and oxide layer 19 into the substrate 14 to produce electron-hole pairs. The holes tend to diffuse through the depletion regions of the diode junctions toward the nearest p-type regions 15 and have the effect of discharging those p-n junctions in proportion to the incident light intensity at the appropriate frequency. The repetitive scan of the reading beam from the assembly 13 has maintained, or re-establishes periodically, a reverse bias on all the diode junctions by depositing negative charge on the p-type regions 15. Nevertheless, it should be noted that this negative charge is deposited only on the p-type regions 15 in the set surrounded by the comb structure 45 or 46 which is currently more positive biased. They are not admitted to those p-type regions 15 which are surrounded by the more negatively biased comb structure. A similar shuttering effect has been observed experimentally in structures such as described in my above-cited copending patent application with E. I. Gordon. Thus, readout of the stored information is obtained only from the p-n junctions surrounded by the more positively biased comb structure. The information obtained during any half period of alternation of the biasing voltages is therefore information concerning only one color of the image even though the beam diameter is greater than the diode spacing. When the biasing voltages have been switched in response to a change in the signal from source 44, information concerning the other color in the image is then read out in response to recharging of the appropriate p-n junctions by the reading electron beam. In each case, the recharging of the diode junction to its full reverse bias produces a pulse of current through the load resistor 20; and a corresponding output signal is coupled through the capacitor 22.

For a device designed for sensitivity in the visible and near infrared portion of the spectrum, the target structure 11 is typically made as follows. A slice of monocrystalline n-type silicon, 0.5 to 15 mils thick, is polished to form the substrate 14, then oxidized to form a layer of silicon dioxide in which an array of apertures 8 microns in diameter, 20 microns center-to-center, is etched using conventional photolithographic masking and etching techniques. The layer of silicon dioxide so etched forms the oxide insulating coating 16. Boron is diffused into the exposed areas of the substrate 14 under appropriate diffusion conditions to form the p-type regions 15, with the oxide layer 16 acting as a diffusion mask. Any boron glass or impurity layer that tends to form on the oxide layer is removed with a suitable solvent or etchant. To facilitate making a good ohmic contact 39 to the substrate 14, phosphorus is diffused into the exposed areas of the substrate under appropriate diffusion conditions; and any resulting glass or impurity layer is then removed from the oxide layer 16 with a suitable solvent or etchant. In the region not previously doped with boron, the phosphorus makes the material n+; and a good contact 39 is easily made to such material by a conventional technique employing a vacuum-evaporated metal (gold, for example). In addition, the phosphorus diffusion has been found to improve the bulk properties of the device. The silicon dioxide insulating layer 19 is then formed on the back surface of the substrate 14 to a depth of 0.6 micron in the presence of steam at 950 degrees centigrade or at temperatures as much as several hundred degrees lower. The thin gold electrode 18 is then deposited over wet oxide layer 19 on the back surface to a depth of 0.02 micron by vacuum deposition. Electrode 18 could also be a transparent layer of tin oxide.

It should be noted that the foregoing process is readily modified to employ a substrate 14 of p-type material and target regions 15 of n-type material. In this case, the reading electron beam is employed to remove electrons by secondary emission. The diodes are thus reversed biased. Now the incident light image can partially discharge the junctions by creating electron-hole pairs. In this case, the electrons diffuse through the depletion regions of the p-n junctions.

It will be noted that only two colors are provided in the embodiment of FIG. 1, inasmuch as this may be sufficient to provide a more pleasing effect to the viewer than black-and-white in many applications. Nevertheless, it should be apparent that the operation can, in principle, be extended to three or more colors by appropriate modifications of the comb structures; for example, the comb structures could cross each other at certain points as necessary if an insulating thin film is deposited therebetween during fabrication. Red and green filters were specified above for the embodiment of FIG. 1. Blue color information could be supplied in like manner through a suitable interference filter, which would be deposited in stripes alternating with the red and green filters 47 and 48.

Figure 4:
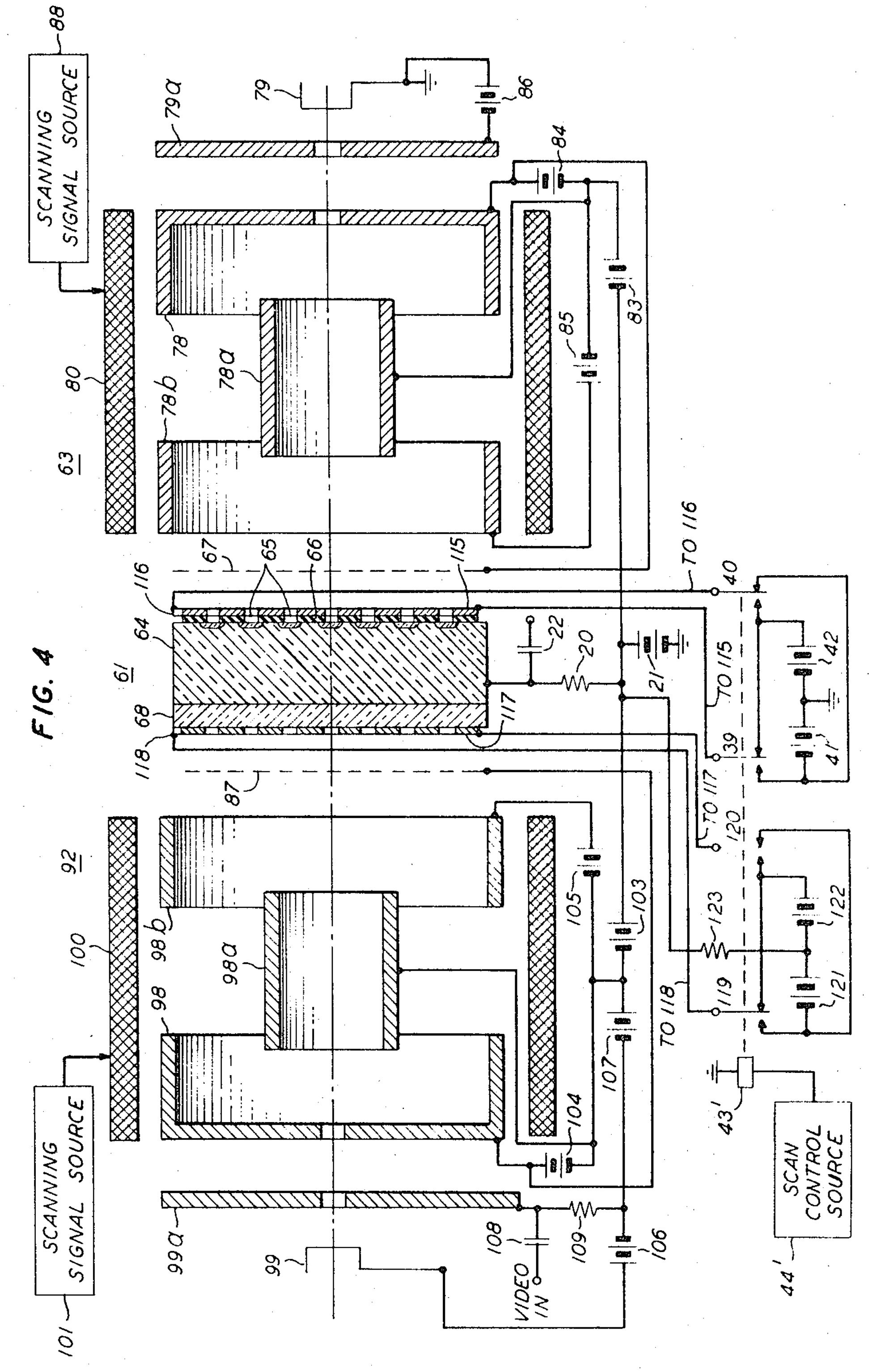
FIG. 4 is a partially pictorial and partially schematic illustration of another embodiment of the invention employed as a scan converter.

In a scan converter according to my invention, as illustrated in FIG. 4, interleaved comb structures on both surfaces of the target 61 are used to prevent reading and writing, or charge storage, in the same p-n junction at the same time.

Figure 5:
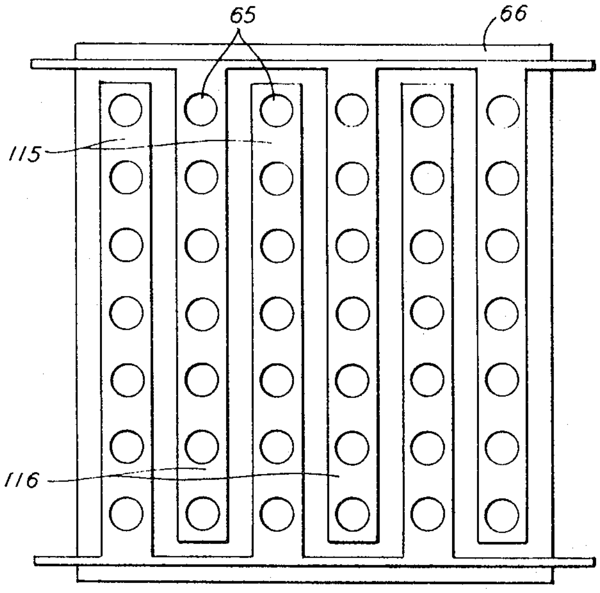
FIG. 5 is a pictorial right-side elevation of the target of the embodiment of FIG. 4.
Figure 6:
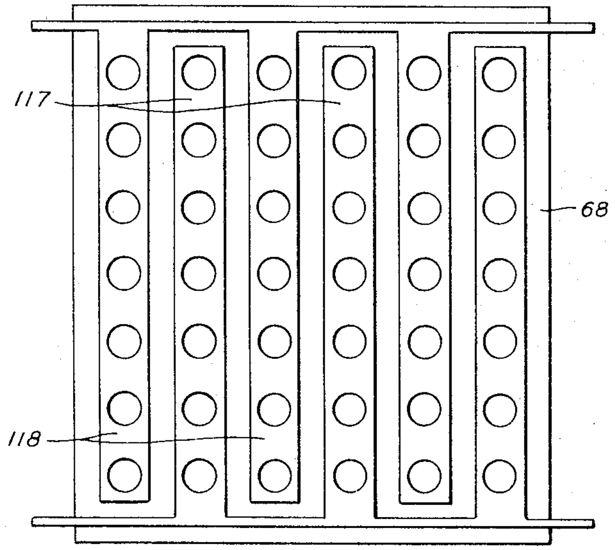
FIG. 6 is a pictorial left-side elevation of the target of the embodiment of FIG. 4.

In FIG. 4, all components numbered the same as components of the embodiments of FIG. 1 are substantially identical thereto. In certain instances, components of assembly 63, which may be similar to components of assembly 13 of FIG. 1, but perhaps having different biases, are numbered fifty digits higher than the corresponding components of FIG. 1. The embodiment includes a target assembly 61 like assembly 11 of FIG. 1 with the following differences. In place of the field-effect electrode 18 and oxide insulating layer 19 of FIG. 1, a heterojunction is formed on the light-receiving side of the n-type silicon substrate 64 by epitaxial deposition of an n-type germanium layer 68. Over the layer 68 are deposited interleaved conductive comb structures 117 and 118, which have apertures directly opposite the p-type regions 65. The details of these comb structures may be more fully appreciated in the left-side elevation of the target 11, as shown in FIG. 6. Comb structures 115 and 116 are deposited over the insulating layer 66 on the reading beam surface of the target 61 and are essentially similar to the comb structures 45 and 46 of FIG. 1. The details of these comb structures may be more fully appreciated from the right-side elevation of target 11, as shown in FIG. 5. Comb structures 115 and 117 are in registration on opposite surfaces of the wafer; as are also comb structures 116 and 118.

The writing electron beam assembly 92 includes an electron gun comprising the cathode 99, apertured electrode **99*a*, accelerating anode 98, focusing electrode 98*a*, and collimating electrode 98*b*. It also includes the magnetic deflection yoke 100 which is energized from the scanning signal source 101. The image-responsive signal, typically derived from a separate television camera tube or received from the transmission medium, as applied through coupling capacitor 108 to load resistor 109 and to the apertured electrode 99*a*. Electrode 99*a* acts as a control grid for the electron beam. A secondary collector electrode 87 is provided in the assembly 92 in essentially the same manner as the electrode 67 on the reading beam side or the electrode 17** of FIG. 1. The writing electron beam may have an effective width at least as great as the minimum separation of diode junctions belonging to different sets.

In order to provide the appropriate coordination of the gating voltages applied to the conductive comb structures 115, 116, 117 and 118, they are interconnected with switches and voltage sources as follows. Comb structures 115 and 116 are connected through double throw switches 39 and 40 respectively to the bias sources 41 and 42 as in FIG. 1. Comb structure 118 is connected to the pole of double throw switch 119, the make contact of which is connected to the negative terminal of battery 121 and the break contact of which is connected to the positive terminal of battery 122. The positive terminal of battery 121 and the negative terminal of battery 122 are connected together and serially through resistor 123 to the positive terminal of battery 21. Conductive comb structure 117 is connected to the pole of double throw switch 120, the make contact of which is connected to the positive terminal of battery 122 and the break contact of which is connected to the negative terminal of battery 121. Switches 39, 40, 119 and 120 are all operated by relay 43′ energized from a scan control source 44′, which are essentially the same as the corresponding components of FIG. 1.

A typical set of biases with respect to ground in the embodiment of FIG. 4 are as follows.

| Component: | Volts |
|---|---|
| **64** | +5 |
| **79*a*** | −20 |
| **78** and **67** | +300 |
| **78*a*** | +67 |
| **78*b*** | +100 |
| **41** | −2 |
| **42** | +2 |
| **99** | −2,000 |
| **99*a*** | −2,020 |
| **98** and **87** | −1,700 |
| **98*a*** | −1,950 |
| **98*b*** | −1,900 |
| **121** (negative terminal) | −100 |
| **122** (positive terminal) | +2 |

These voltages are established by suitable bias sources as shown.

In operation, the scanning converter of FIG. 4 provides readout during at least one full frame period from only one set of p-n junctions, for example, those surrounded by comb structure 115 and at the same time provides writing of information in only the other set of p-n junctions, which are discharged partially in response to electrons admitted from assembly 92 through comb structure 118. It is seen that during this period of time, comb structure 115 is positively biased so that electrons can be admitted through its apertures to the overlying p-n junctions; while comb structure 116 is negatively biased so as to prevent electrons from passing through its apertures. Also, comb structure 118 is positively biased to admit electrons through its apertures and to permit the holes to diffuse to the junctions; while comb structure 117 is negatively biased to prevent electron-generated holes from diffusing to the p-n junctions, even though electrons pass through its apertures. Alternatively, the negative bias could make comb structure 117 more negative than cathode 99, so that electrons could not pass through its apertures. The electrons passing through comb structure 118 are effective to create electron-hole pairs in the substrate 64. These holes diffuse through the depletion region of the nearest diode junctions and serve to discharge those junctions partially. The electrons admitted through comb structure 115 to the other set of diodes are effective to recharge those diode junctions to their full reverse bias, and at the same time, produce corresponding output current pulses through load resistor 20. These pulses are coupled through capacitor 22 as the output signal. When relay 43' is now released in response to a change in the signal from control source 44', the sets of diodes scanned by the reading electron beam and the writing beam respectively are interchanged at least for another full frame of the slowest scan.

In the embodiment of FIG. 4, the slow scan is illustratively that of the writing beam. Hence, the heterojunction between layer 68 and substrate 64 provides some trapping of the electron-produced holes so that repetitive readouts by the reading beam can be made without writing of new information in the diode junctions from which information is being read. The details of this cooperation are described in more detail in my above-cited patent application with E. I. Gordon.

It should be apparent that the gating or shuttering effect provided by my present invention would also be useful in scan converters in which the scanning rates of the reading and writing electron beams are reversed. In that case, the heterojunction is unnecessary; and a target structure more like target assembly 11 of FIG. 1 may be employed. Also, in scan converters according to my invention, the p-type and n-type regions may be reversed, and provision may be made by operating so that the reading electron beam removes electrons by secondary emission rather than depositing electrons. The electrons of the electron-produced electron-hole pairs are now effective in the partial discharging of the diode junctions in response to the writing electron beam.

As in the camera of FIG. 1, a scan converter can be operated with more than two separate stored images by arranging the interleaved comb structures so that some cross over others and are insulated therefrom by appropriate thin films of insulating material.

What is claimed is:

1. In an electron beam storage device, the combination comprising,

- a target structure comprising a semiconductive wafer including a plurality of p-n junctions near a first surface thereof,
- means for storing different combinations of image information in different interleaved sets of said junctions, and
- means for reading out information stored in said junctions, comprising
  - means for repetitively scanning said first surface with an electron beam,
  - means for admitting electrons from said beam to junctions in only one of said sets in any one scan, and
  - means for producing an output current from the admitted electrons.

2. In an electron beam storage device, the combination according to claim 1 in which the means for admitting electrons comprises,

- a plurality of interleaved comb structures disposed on the first surface of the wafer and provided with apertures centered over the p-n junctions in respective sets of the plurality of junctions and
- switching means for applying to one of said comb structures a voltage of a first value and simultaneously for applying to at least another comb structure a voltage of a second value substantially more negative than said first value to repel electrons of the electron beam and for interchanging the application of said voltages of said first and second values to said comb structures.

3. In an electron beam storage device, the combination according to claim 2 in which the means for storing different combinations of image information comprises,

- means for forming on a second surface of the wafer opposite the first surface a light image from light having a plurality of colors and
- filters disposed between said forming means and said first surface to pass light of said different colors to respective sets of the p-n junctions.

4. In an electron beam storage device, the combination according to claim 2 in which the means for storing different combinations of image information comprises,

- a second plurality of interleaved comb structures disposed on a second surface of the wafer opposite the first surface and provided with apertures centered over the p-n junctions in said respective sets of junctions,
- means for repetitively scanning the second surface with a second electron beam, and
- swtching means for applying to one of said second plurality of comb structures a voltage of a third value and simultaneously for applying to at least another of said second plurality of comb structures a voltage of a fourth value substantially more negative than said first value and for interchanging the application of said voltages of said third and fourth values to said second plurality of comb structures in a sequence that prevents simultaneous storage and readout through comb structures in registration on the first and second surfaces.

References Cited

UNITED STATES PATENTS

| | | | |
|---|---|---|---|
| 3,087,985 | 4/1963 | Heijne et al. | 315—11 XR |
| 3,322,955 | 3/1967 | Desuignes | 313—66 XR |
| 3,343,002 | 9/1967 | Ragland | 250—211 XR |

RODNEY D. BENNETT, Jr., Primary Examiner

J. P. MORRIS, Assistant Examiner

U.S. Cl. X.R.

178—7.6; 250—211; 313—66, 96